US010562396B2

(12) United States Patent
Tokura

(10) Patent No.: US 10,562,396 B2
(45) Date of Patent: Feb. 18, 2020

(54) PARKING ASSISTANCE APPARATUS AND SYSTEM

(71) Applicant: IHI CORPORATION, Tokyo (JP)

(72) Inventor: Susumu Tokura, Tokyo (JP)

(73) Assignee: IHI Corporation, Tokyo (JP)

( * ) Notice: Subject to any disclaimer, the term of this patent is extended or adjusted under 35 U.S.C. 154(b) by 348 days.

(21) Appl. No.: 15/180,182

(22) Filed: Jun. 13, 2016

(65) Prior Publication Data

US 2016/0288657 A1  Oct. 6, 2016

Related U.S. Application Data

(63) Continuation of application No. PCT/JP2014/083359, filed on Dec. 17, 2014.

(30) Foreign Application Priority Data

Dec. 20, 2013  (JP) .................................. 2013-264199

(51) Int. Cl.
  B60L 11/18  (2006.01)
  G01D 5/20  (2006.01)

(52) U.S. Cl.
  CPC .......... *B60L 11/182* (2013.01); *G01D 5/2006* (2013.01)

(58) Field of Classification Search
  CPC .... B60L 11/18; B60L 11/1824; B60L 11/182; G01D 5/20; G01D 50/2006; H02J 17/00
  See application file for complete search history.

(56) References Cited

U.S. PATENT DOCUMENTS

| 2010/0117596 A1* | 5/2010 | Cook .................... | B60L 11/182 320/108 |
| 2011/0285349 A1* | 11/2011 | Widmer ................ | B60L 11/182 320/108 |
| 2013/0037365 A1* | 2/2013 | Ichikawa .............. | B60L 11/123 191/10 |
| 2013/0313912 A1* | 11/2013 | Abe ....................... | H02J 5/005 307/104 |

(Continued)

FOREIGN PATENT DOCUMENTS

| CN | 102611204 A | 7/2012 |
| JP | 54-066166 A | 5/1979 |

(Continued)

OTHER PUBLICATIONS

International Search Report, PCT/JP2014/083359, dated Mar. 31, 2015, 3 pgs.

*Primary Examiner* — Neel D Shah

(74) *Attorney, Agent, or Firm* — Volpe and Koenig, P.C.

(57) ABSTRACT

A parking assistance system is provided which includes: a parking assistance apparatus that is installed along with a wireless power-supplying device and has a plurality of exciting coils installed around a power-supplying coil provided for the wireless power-supplying device and a plurality of resonators connected to the respective exciting coils and set to resonate due to leakage magnetic flux of the power-supplying coil; and a movable vehicle that detects magnetic flux generated by the exciting coils provided for the parking assistance apparatus, determines a position of the movable vehicle based on a result of the detection and displays the position on a display device.

20 Claims, 5 Drawing Sheets

(56) References Cited

U.S. PATENT DOCUMENTS

| | | | | |
|---|---|---|---|---|
| 2014/0354041 | A1* | 12/2014 | Yoshi | H02J 7/025 |
| | | | | 307/9.1 |
| 2015/0291048 | A1* | 10/2015 | Ichikawa | B60L 3/106 |
| | | | | 701/22 |
| 2016/0176301 | A1* | 6/2016 | Huang | H01F 38/14 |
| | | | | 320/108 |
| 2016/0243955 | A1* | 8/2016 | Yoshida | B62D 15/028 |

FOREIGN PATENT DOCUMENTS

| | | |
|---|---|---|
| JP | 54-073070 A | 6/1979 |
| JP | 2010-183813 A | 8/2010 |
| JP | 2011-160515 A | 8/2011 |
| JP | 5010715 B2 | 8/2012 |
| JP | 2013-153564 A | 8/2013 |
| WO | 2013/108324 A1 | 7/2013 |

* cited by examiner

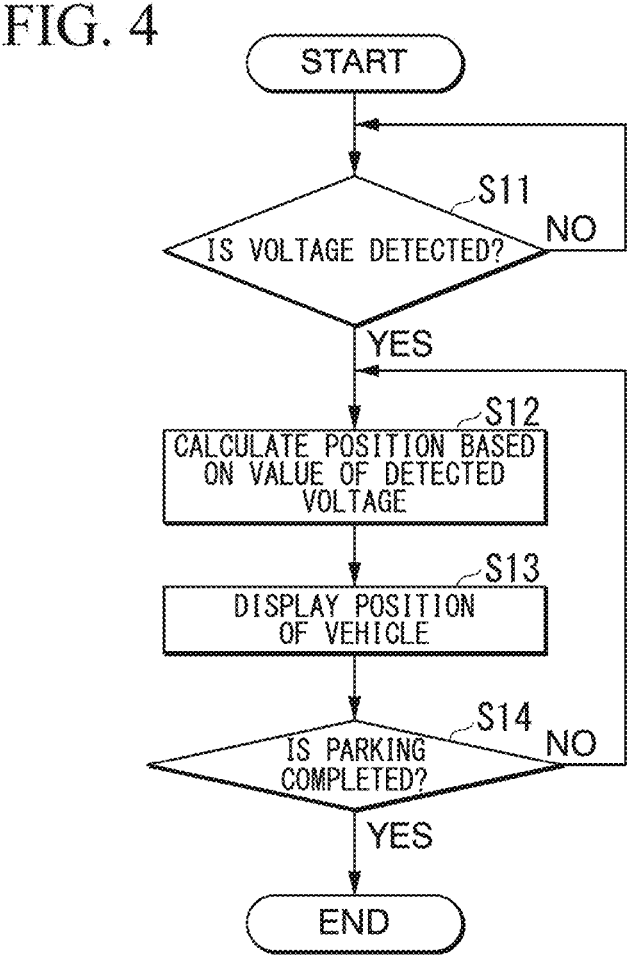

PARKING ASSISTANCE APPARATUS AND SYSTEM

The present disclosure relates to a parking assistance apparatus and system.

This application is a continuation application based on a PCT Patent Application No. PCT/JP2014/083359, filed on Dec. 17, 2014, whose priority is claimed on Japanese Patent Application No. 2013-264199, filed on Dec. 20, 2013. The contents of both the PCT application and the Japanese Patent Application are incorporated herein by reference.

TECHNICAL FIELD

Background Art

In recent years, wireless power supply systems capable of wirelessly supplying electric power from a power-supplying side toward a power-receiving side have been actively developed. Such wireless power supply systems can supply electric power without connecting the power-supplying side and the power-receiving side using wiring (a cable) and are highly convenient. Hence, wireless power supply systems have the potential for use in charging batteries mounted in movable vehicles such as an electric vehicle (EV) or a plug-in hybrid electric vehicle (PHEV).

In a wireless power supply system used for charging a battery mounted in such a movable vehicle, to wirelessly transmit electric power in an efficient way, it is necessary to arrange a coil of the power-supplying side (power-supplying coil installed on the ground) and a coil of the power-receiving side (power-receiving coil installed in the movable vehicle) in a suitable relative positional relationship. For this reason, it is very important to park the movable vehicle that wirelessly receives the supplied electric power at a position at which the relative positional relationship between the power-supplying coil and the power-receiving coil is suitable.

A parking assistance apparatus is disclosed in Patent Document 1 below, which provides an image-capturing device for capturing an image of an exterior of a vehicle, recognizes a power-transmitting unit based on the image captured by the image-capturing device, and performs control of moving the vehicle to a position at which the recognized power-transmitting unit is installed. It can be assumed to install an exciting coil on the ground and a probing coil in the movable vehicle, to detect a voltage induced by a magnetic flux interlinking with the probing coil when the probing coil approaches the exciting coil to detect the position of the movable vehicle, and to adjust a parking position of the movable vehicle based on the detected result.

DOCUMENT OF RELATED ART

Patent Document

[Patent Document 1]
 Japanese Patent No. 5010715

SUMMARY

Technical Problem

Since the technique disclosed in Patent Document 1 above includes controlling movement of the movable vehicle based on the result of recognizing the power-transmitting unit, it is considered to be possible to accurately park the movable vehicle at the position at which the power-transmitting unit is installed. However, in Patent Document 1 above, since image processing is performed by recognizing the power-transmitting unit, there is considered to be a risk of restricting a size, a shape, and a pattern of an available power-transmitting unit and of restricting the position and method of installation of the power-transmitting unit.

Also, in the method of detecting the position of the movable vehicle using the above-described exciting and probing coils, if there is not much magnetic flux interlinked in a state in which the exciting coil installed on the ground and the probing coil installed in the movable vehicle overlap each other in a top view, the voltage induced in the probing coil is too low to detect the position of the movable vehicle. For this reason, for example, when the power-supplying coil is used as the exciting coil, the position of the movable vehicle cannot be detected unless the probing coil installed in the movable vehicle is positioned directly above the power-supplying coil.

Here, to adjust the parking position of the movable vehicle, it is necessary to perform, for instance, a quick turn of the movable vehicle. However, to perform the quick turn of the movable vehicle, it is necessary to move the movable vehicle backward and forward within a range of about two meters. However, if the movable vehicle is advanced about two meters from an original parking position, it is impossible to detect the position of the movable vehicle, and hence there is a problem in that it is impossible to minutely adjust the parking position with reference to the parking position of the movable vehicle.

Accordingly, the present disclosure is conceived in view of the above-described circumstances, and an object of the present disclosure is to provide a parking assistance apparatus and system capable of adjusting a parking position with reference to a position of the movable vehicle.

Solution to Problem

A first aspect of the present disclosure provides a parking assistance apparatus that assists with parking of a movable vehicle in a parking area in which a power-supplying coil wirelessly supplying electric power to a power-receiving coil provided in the movable vehicle is installed, the parking assistance apparatus including: a plurality of exciting coils installed around the power-supplying coil; and a plurality of resonators connected to the respective exciting coils and set to resonate due to leakage magnetic flux of the power-supplying coil.

Also, the parking assistance apparatus according to a second aspect of the present disclosure is configured so that the exciting coils are set to mutually have different numbers of turns.

Also, the parking assistance apparatus according to a third aspect of the present disclosure is configured so that the numbers of turns of the exciting coils are set so that generated magnetic flux gradually increases or decreases toward the power-supplying coil.

Also, the parking assistance apparatus according to a fourth aspect of the present disclosure is configured so that the exciting coils are radially arranged around the power-supplying coil at a constant interval or are arranged in a circumferential direction of concentric circles centered at the power-supplying coil at a constant interval.

A parking assistance system according to a fifth aspect of the present disclosure assists with parking in a parking area in which a power-supplying coil wirelessly supplying electric power is installed, and includes: the parking assistance apparatus; and the movable vehicle having a detector that detects magnetic flux generated by the exciting coils provided for the parking assistance apparatus, a position calculator that determines a position of the movable vehicle based on a detected result of the detector, and a display unit that displays the position determined by the position calculator.

Also, the parking assistance system according to a sixth aspect of the present disclosure is configured so that the movable vehicle includes the power-receiving coil that receives the electric power wirelessly supplied from the power-supplying coil.

Also, the parking assistance system according to a seventh aspect of the present disclosure is configured so that the power-receiving coil serves as the detector.

Also, the parking assistance system according to an eighth aspect of the present disclosure is configured so that the display unit displays a positional relationship between the power-supplying coil and the movable vehicle based on a calculated result of the position calculator.

Also, the parking assistance apparatus according to a ninth aspect of the present disclosure assists with parking of a movable vehicle in a parking area in which a power-supplying coil wirelessly supplying electric power to a power-receiving coil provided in the movable vehicle is installed, the parking assistance apparatus including: a plurality of exciting coils installed around the power-supplying coil; and a plurality of resonators connected to the respective exciting coils.

Effects

According to the present disclosure, the parking assistance apparatus is installed along with the wireless power-supplying device and has the plurality of exciting coils installed around the power-supplying coil provided for the wireless power-supplying device and the plurality of resonators connected to the respective exciting coils and set to resonate due to leakage magnetic flux of the power-supplying coil. The magnetic flux generated by the exciting coils provided for the parking assistance apparatus is detected, and the position of the movable vehicle is determined and displayed. Thus, there is an effect that a parking position can be adjusted with reference to the position of the movable vehicle.

BRIEF DESCRIPTION OF DRAWINGS

FIG. 4 is a flow chart illustrating an operation of the parking assistance system according to the embodiment of the present disclosure.

DESCRIPTION OF EMBODIMENTS

Figure 1:
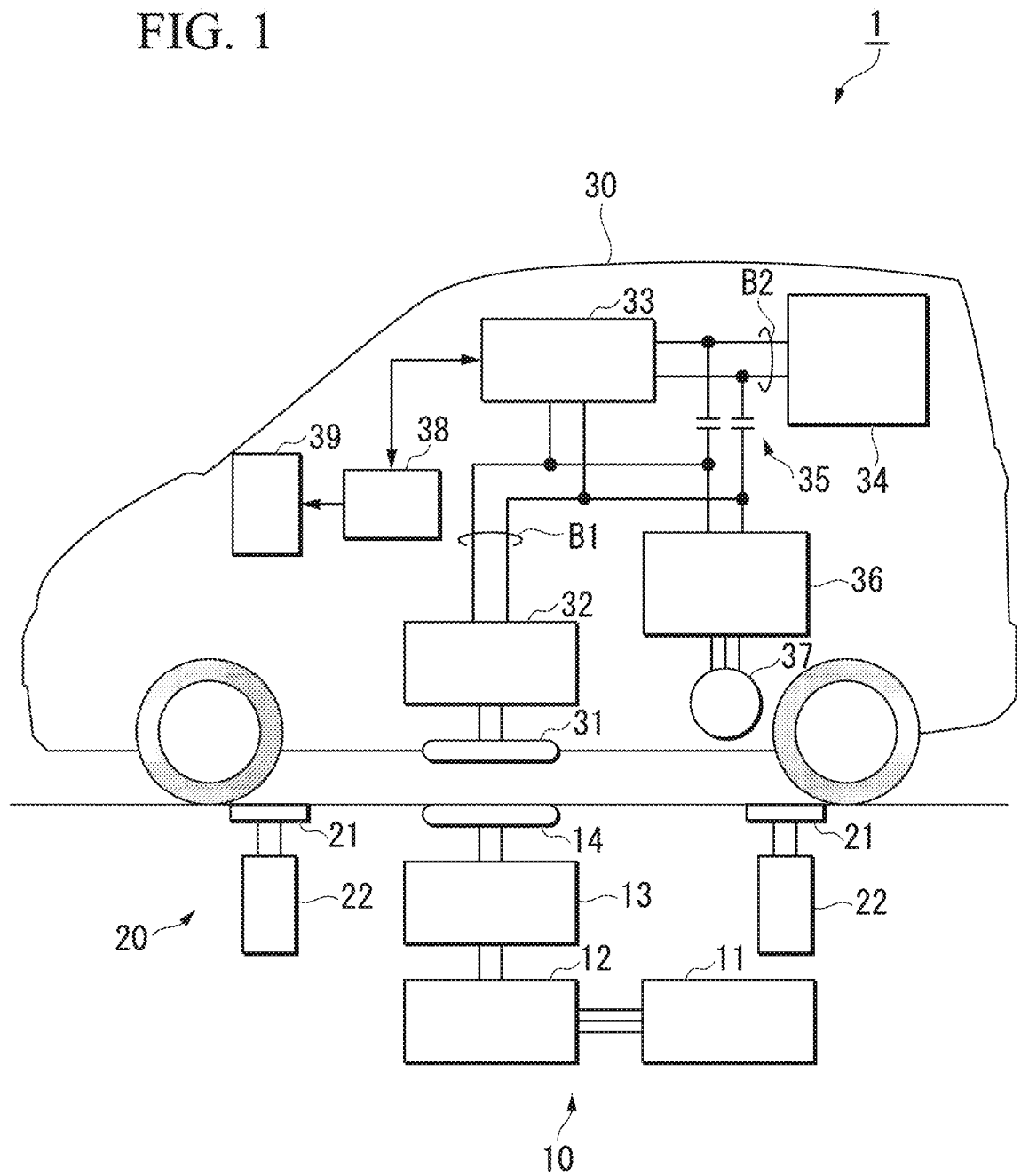
FIG. 1 is a block diagram illustrating constitutions of major parts of a parking assistance apparatus and system according to an embodiment of the present disclosure.

Hereinafter, a parking assistance apparatus and system according to a first embodiment of the present disclosure will be described in detail with reference to the drawings. FIG. 1 is a block diagram illustrating constitutions of major parts of a parking assistance apparatus and system according to an embodiment of the present disclosure. As illustrated in FIG. 1, the parking assistance system 1 of the present embodiment is provided with a parking assistance apparatus 20 installed along with a wireless power-supplying device 10, and a movable vehicle 30, and assists with parking of the movable vehicle 30 at a position at which the movable vehicle 30 can receive electric power supplied from the wireless power-supplying device 10.

The wireless power-supplying device 10 is provided with an external power supply 11, a rectifier circuit 12, a power-supplying circuit 13, and a power-supplying coil 14, produces electric power suitable for wireless supply of electric power to the movable vehicle 30, and wirelessly supplies the electric power to the movable vehicle 30. The wireless power-supplying device 10 is installed, for instance, in a parking space, and wirelessly supplies the electric power to the movable vehicle 30 that is parked in a parking area (parking region) partitioned with white lines or the like.

Output terminals of the external power supply 11 are connected to input terminals of the rectifier circuit 12, and the external power supply 11 supplies alternating current (AC) power required to supply electric power to the movable vehicle 30. The external power supply 11 is a system power supply that supplies three-phase AC power for, e.g., 200 V or 400 V, or single-phase AC power for 100 V. Input terminals and output terminals of the rectifier circuit 12 are connected to the external power supply 11 and the power-supplying circuit 13, respectively, and the rectifier circuit 12 rectifies the AC power supplied from the external power supply 11 to convert it to direct current (DC) power, and outputs the converted DC power to the power-supplying circuit 13.

Input terminals and output terminals of the power-supplying circuit 13 are connected to the rectifier circuit 12 and the power-supplying coil 14, respectively, and the power-supplying circuit 13 converts the DC power from the rectifier circuit 12 to AC power, and outputs the converted AC power to the power-supplying coil 14. To be specific, the power-supplying circuit 13 is provided with a resonance capacitor (not illustrated) constituting a power-supplying side resonance circuit along with the power-supplying coil 14, converts the DC power from the rectifier circuit 12 to AC power (high-frequency power) having a higher frequency than the AC power of the external power supply 11 under the control of a power-supplying control circuit (not illustrated), and outputs the converted AC power to the power-supplying coil 14.

The power-supplying coil 14 generates a magnetic field corresponding to the high-frequency power supplied from the power-supplying circuit 13, and thereby wirelessly performs the supply of electric power to the movable vehicle 30. Both terminals of the power-supplying coil 14 are connected to the output terminals of the power-supplying circuit 13, and the power-supplying coil 14 is installed above or below ground in an exposed state or in a state in which it is molded by a non-magnetic material such as a plastic. To be specific, the power-supplying coil 14 is a coil (solenoid type coil) in which a conductive wire such as a round wire or a rectangular wire is wound in a helical shape and in a preset shape (e.g., a quadrilateral tube shape), or a coil (helical type coil) in which a conductive wire such as a round wire or a rectangular wire is wound within the same plane in a spiral shape.

The parking assistance apparatus 20 is provided with a plurality of exciting coils 21 and a plurality of resonators 22 connected to the respective exciting coils 21, and is an apparatus that is installed along with the wireless power-supplying device 10 in order to assist with parking of the movable vehicle 30 in a parking area in which the power-supplying coil 14 of the wireless power-supplying device 10 is installed. The exciting coils 21 are installed around the power-supplying coil 14 provided for the wireless power-supplying device 10, and produce a magnetic field (magnetic flux) for allowing the movable vehicle 30 to detect its own position. Like the power-supplying coil 14, the exciting coils 21 are installed above or below the ground.

Each of the exciting coils 21 is a coil in which a conductive wire such as a round wire or a rectangular wire is wound in a helical shape and in a preset shape (e.g., an annular shape), and is installed in consideration of a leakage magnetic field (leakage magnetic flux) of the power-supplying coil 14 of the wireless power-supplying device 10, or directions of the magnetic fields which the other exciting coils 21 form. For example, the exciting coil 21 disposed closest to the power-supplying coil 14 is disposed so that a coil surface (winding surface of the conductive wire) is as close to orthogonal to the leakage magnetic field of the power-supplying coil 14 as possible. In the exciting coils 21, at least parts of leads connected to the resonators 22 may be orthogonal to, for instance, the leakage magnetic field of the power-supplying coil 14.

To generate magnetic fields whose magnitudes are different from one another, the exciting coils 21 are set so that the numbers of turns thereof are different from one another. Thus, the movable vehicle 30 can detect its own position if the movable vehicle 30 detects a magnitude of the voltage induced by the magnetic fields generated from the exciting coils 21. For example, the numbers of turns of the exciting coils 21 are set so that the magnitudes of the generated magnetic fields gradually increase or decrease toward the power-supplying coil 14 of the wireless power-supplying device 10.

Figure 2:
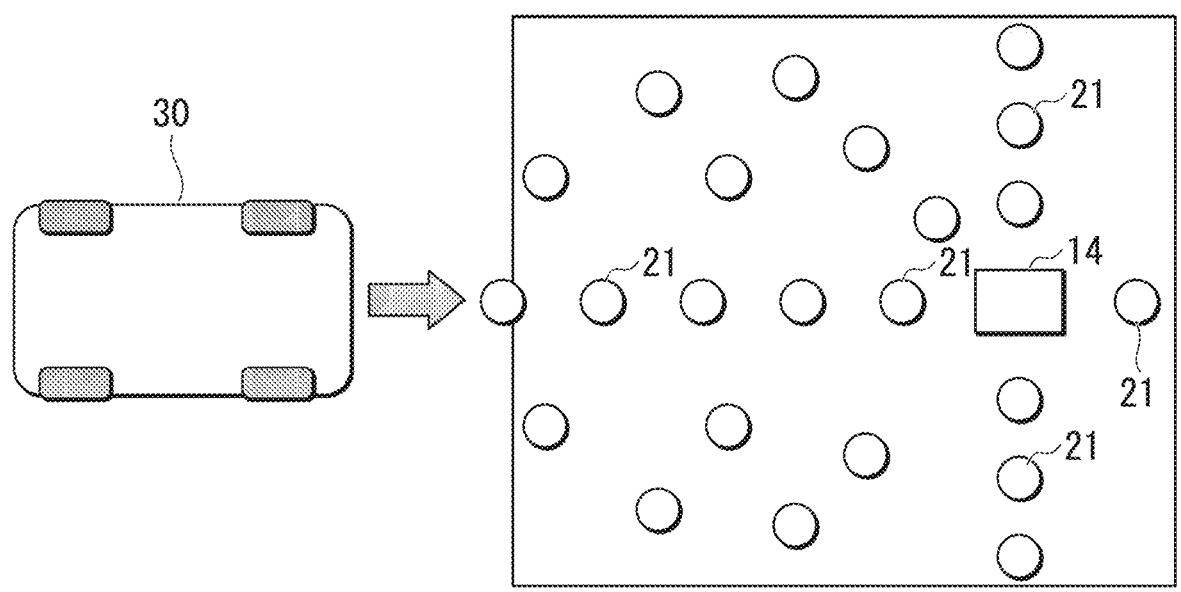
FIG. 2 is a top view illustrating an example of arrangement of exciting coils in the parking assistance apparatus according to the embodiment of the present disclosure.

FIG. 2 is a top view illustrating an example of arrangement of exciting coils in the parking assistance apparatus according to the embodiment of the present disclosure. In the example illustrated in FIG. 2, the exciting coils 21 are radially arranged around the power-supplying coil 14 of the wireless power-supplying device 10 within a rectangular parking area at a constant interval (e.g., about tens of centimeters), or are arranged at a constant interval in circumferential directions of concentric circles centered at the power-supplying coil 14.

That is, in the example illustrated in FIG. 2, the exciting coils 21 are disposed at a constant interval along a straight line that extends through the power-supplying coil 14 in a direction in which the movable vehicle 30 moves forward/backward (forward/backward moving direction), and are disposed at a constant interval along a straight line that extends through the power-supplying coil 14 in a direction perpendicular to the forward/backward moving direction. Also, the exciting coils 21 that are not disposed along these straight lines are arranged at a approximately constant interval in the circumferential directions of the concentric circles centered at the power-supplying coil 14. Intervals among the concentric circles and the intervals among the exciting coils 21 in the circumferential directions of the concentric circles are also set to, for instance, about tens of centimeters.

Here, the exciting coil 21 disposed closest to the power-supplying coil 14 $r$ resonates with the leakage magnetic field of the power-supplying coil 14, and generates the magnetic field. Each of the exciting coils 21 excluding this exciting coil 21 closest to the power-supplying coil 14 resonates with the magnetic fields generated by the other exciting coils 21, and generates the magnetic fields. For this reason, the exciting coils 21 excluding the exciting coil 21 disposed closest to the power-supplying coil 14 can also be called relay coils for resonating the other exciting coils 21.

The resonators 22 are connected to the above-described exciting coils 21, and are set so that circuits made up of the exciting coils 21 and the resonators 22 resonate with the leakage magnetic field of the power-supplying coil 14 or the magnetic fields which the other exciting coils 21 form. To be specific, the resonators 22 are provided with capacitors (not illustrated) that form resonance circuits along with the exciting coils 21. When the leakage magnetic field is generated from the power-supplying coil 14 or when the other exciting coils 21 form the magnetic fields, the resonators 22 resonate with either of these magnetic fields.

The movable vehicle 30 is a vehicle that is driven by a driver to travel on a road, for instance an electric vehicle or a hybrid vehicle that is provided with a motor acting as a motive power generation source. As illustrated in FIG. 1, the movable vehicle 30 is provided with a power-receiving coil (detector) 31, a power-receiving circuit 32, a charging circuit 33, a storage battery 34, a contactor 35, an inverter 36, a motor 37, a controller (position calculator) 38, and a display device (display unit) 39. Here, among these, the power-receiving circuit 32, the charging circuit 33, and the inverter 36 are connected to a DC bus B1, and the charging circuit 33 and the storage battery 34 are connected to a DC bus B2.

Like the above-described power-supplying coil 14, the power-receiving coil 31 is a solenoid type coil or a helical type coil, and is provided at the bottom of the movable vehicle 30. Both ends of the power-receiving coil 31 are connected to input terminals of the power-receiving circuit 32, and the power-receiving coil 31 generates an electromotive force due to electromagnetic induction when an electromagnetic field of the power-supplying coil 14 acts thereon, and outputs the generated electromotive force to the power-receiving circuit 32. The power-receiving coil 31 is also used to detect the magnetic fields formed by the exciting coils 21 provided for the above-described parking assistance apparatus 20.

The input terminal and an output terminal of the power-receiving circuit 32 are connected to the both ends of the power-receiving coil 31 and the DC bus B1, respectively, and the power-receiving circuit 32 converts AC power supplied from the power-receiving coil 31 to DC power, and outputs the converted DC power to the DC bus B1. The power-receiving circuit 32 is provided with a resonance capacitor (not illustrated) constituting a power-receiving side resonance circuit along with the power-receiving coil 31. Capacitance of the resonance capacitor of the power-receiving circuit 32 may be set so that a resonance frequency of the power-receiving side resonance circuit is the same as that of the above-described power-supplying side resonance circuit.

An input terminal and an output terminal of the charging circuit 33 are connected to the DC bus B1 and the DC bus B2, respectively, and the charging circuit 33 charges the storage battery 34 with the electric power (DC power) from the power-receiving circuit 32 under the control of the controller 38. The storage battery 34 is a rechargeable battery (e.g., a secondary battery such as a lithium-ion battery or a nickel hydrogen battery) mounted in the movable vehicle 30, and supplies the electric power to the motor 37 and so on.

The contactor 35 is interposed between the DC bus B1 and the DC bus B2, and switches whether the DC bus B1 and the DC bus B2 are connected or disconnected under the control of the controller 38. To be specific, when the storage battery 34 is charging, the contactor 35 is controlled to disconnect the DC bus B1 and the DC bus B2. Thereby, the storage battery 34 is disconnected from the inverter 36 and the power-receiving circuit 32, and the motor 37 is electrically separated from the storage battery 34. In contrast, when the electric power of the storage battery 34 is discharging, the contactor 35 is controlled to connect the DC bus B1 and the DC bus B2. Thereby, the storage battery 34 is connected to the inverter 36 and the power-receiving circuit 32.

The inverter 36 drives the motor 37 using the electric power supplied from the storage battery 34 via the contactor 35 under the control of the controller 38. The motor 37 is mounted in the movable vehicle 30 as the motive power generation source that generates motive power for moving the movable vehicle 30, and generates motive power in response to driving of the inverter 36. As the motor 37, a motor such as a permanent magnet type synchronous motor or an induction motor may be used.

The controller 38 generally controls an operation of the movable vehicle 30. For example, the controller 38 controls the charging circuit 33 based on information (information indicating electric energy supplied from the power-receiving circuit 32 to the DC bus B1, information indicating a state of charge (SOC) of the storage battery 34, etc.) output from the charging circuit 33. Also, the controller 38 monitors an input voltage of the charging circuit 33 (or an output voltage of the power-receiving circuit 32), and determines a position of the movable vehicle 30 using a monitored result.

As described above, since the numbers of turns of the exciting coils 21 provided for the parking assistance apparatus 20 are set to generate the magnetic fields whose magnitudes are different from one another, if a moving speed of the movable vehicle 30 is constant, the magnitude of the magnetic field detected by the power-receiving coil 31 is dependent on the exciting coil 21 above which the power-receiving coil 31 of the movable vehicle 30 is disposed. Here, since the magnitude of the magnetic field detected by the power-receiving coil 31 is reflected in the input voltage of the charging circuit 33, the controller 38 determines the position of the movable vehicle 30 using the result of monitoring the input voltage of the charging circuit 33.

A display device 39 is a device that displays the position, etc. of the movable vehicle 30 which are determined by the controller 38, and is realized by, for instance, a liquid crystal display device. The display device 39 is installed at a position (e.g., on a dashboard) so that a driver can drive the movable vehicle 30 with reference to displayed content. The display device 39 displays a positional relationship between the power-supplying coil 14 of the wireless power-supplying device 10 and the movable vehicle 30 based on a calculated result of the controller 38.

Figure 3:
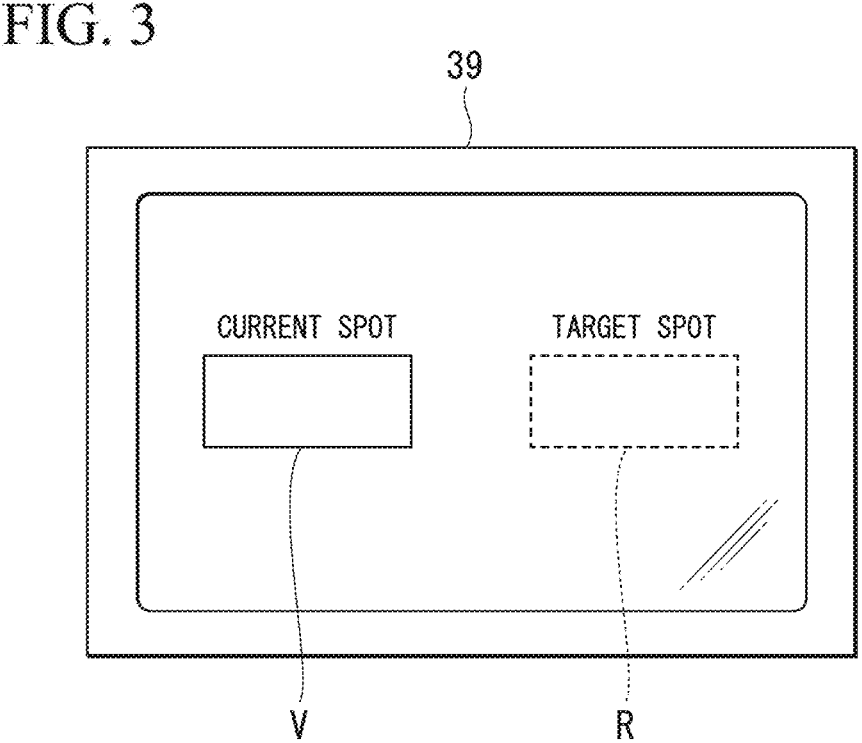
FIG. 3 is a view illustrating an example of display of a display device provided in a movable vehicle according to the embodiment of the present disclosure.

FIG. 3 is a view illustrating an example of display of the display device provided in the movable vehicle according to the embodiment of the present disclosure. As illustrated in FIG. 3, a current spot V for indicating a current position of the movable vehicle 30 and a target spot R for indicating an intended parking position of the movable vehicle 30 are displayed on the display device 39 provided in the movable vehicle 30. The indicated position of the current spot V displayed on the display device 39 is changed by moving the movable vehicle 30. For this reason, if the driver drives and parks the movable vehicle 30 so that the current spot V matches the target spot R, a positional relationship between the power-supplying coil 14 of the wireless power-supplying device 10 and the power-receiving coil 31 of the movable vehicle 30 can be appropriate.

Next, an operation of the parking assistance system 1 in the aforementioned constitution will be described. FIG. 4 is a flow chart illustrating the operation of the parking assistance system according to the embodiment of the present disclosure. Here, an example case will be described in which a driver drives the movable vehicle 30 to move the movable vehicle 30 backward so that the movable vehicle 30 enters the rectangular parking area illustrated in FIG. 2 and is parked there. Also, a sensor (not illustrated) for detecting the ingress of the movable vehicle 30 is provided in the rectangular parking area illustrated in FIG. 2.

When the driver moves the movable vehicle 30 backward so that the movable vehicle 30 enters the rectangular parking area illustrated in FIG. 2, the ingress of the movable vehicle 30 is detected by the aforementioned sensor. Then, the power-supplying circuit 13 of the wireless power-supplying device 10 is controlled by the power-supplying control circuit (not illustrated), and high-frequency power is supplied from the power-supplying circuit 13 to the power-supplying coil 14. Thereby, a magnetic field corresponding to the supplied high-frequency power is generated from the power-supplying coil 14.

When the magnetic field is generated from the power-supplying coil 14, due to a leakage magnetic field thereof, the exciting coils 21 disposed close to the power-supplying coil 14 resonate to generate magnetic fields. When the exciting coils 21 generate the magnetic fields, the exciting coils 21 disposed close to those exciting coils 21 resonate to generate magnetic fields. In this way, when the magnetic field is generated from the power-supplying coil 14, the exciting coils 21 disposed around the power-supplying coil 14 resonate in turn, and the magnetic fields are generated from all the exciting coils 21 provided for the parking assistance apparatus 20. Here, the magnetic fields whose magnitudes are different from one another are generated from the exciting coils 21 provided for the parking assistance apparatus 20.

When the driver moves the movable vehicle 30 backward in the state in which the magnetic fields are generated from all the exciting coils 21 provided for the parking assistance apparatus 20, it is determined by the controller 38 whether or not the voltage caused by the magnetic fields generated by the exciting coils 21 is detected (step S11). To be specific, it is determined by the controller 38 whether or not the input voltage of the charging circuit 33 (or the output voltage of the power-receiving circuit 32) varies.

Immediately after the movable vehicle 30 enters the rectangular parking area illustrated in FIG. 2, the exciting coil 21 of the parking assistance apparatus 20 and the power-receiving coil 31 of the movable vehicle 30 are not superposed in a superposed state in the top view. For this reason, it is determined by the controller 38 that the voltage caused by the magnetic fields generated by the exciting coils 21 is not detected, and the determination result in step S11 becomes "NO." When the determination result in step S11 is "NO," the determination in step S11 is carried out again.

In contrast, the driver moves the movable vehicle 30 backward, and the exciting coil 21 of the parking assistance apparatus 20 and the power-receiving coil 31 of the movable vehicle 30 are in the superposed state in the top view. Then, it is determined by the controller 38 that the voltage caused by the magnetic fields generated by the exciting coils 21 is detected, and the determination result in step S11 becomes "YES." Then, a process of calculating a position of the movable vehicle 30 based on a value of the detected voltage is performed by the controller 38 (step S12).

When the position of the movable vehicle 30 is calculated, the calculated position is displayed on the display device 39 (step S13). To be specific, as illustrated in FIG. 3, a current spot V for indicating a current position of the movable vehicle 30 and a target spot R for indicating an intended parking position of the movable vehicle 30 are displayed on the display device 39. When such display is performed, the driver of the movable vehicle 30 drives the movable vehicle 30 so that the current spot V matches the target spot R with reference to the screen of the display device 39.

Next, it is determined by the controller 38 whether or not parking is completed. For example, it is determined by the controller 38 whether or not a gear stick is set to a parking position (P position) and a parking brake is engaged. When it is determined that the parking is not completed (the determination result in step S14 is "NO"), a process of detecting the magnetic fields generated by the exciting coils 21 to calculate the position of the movable vehicle 30 and a process of displaying the calculated position on the display device 39 are performed (steps S12 and S13).

In contrast, when it is determined that the parking is completed (the determination result in step S14 is "YES"), the series of processes illustrated in FIG. 4 is finished. After the parking of the movable vehicle 30 is completed, for example, when the driver gives instructions to charge the movable vehicle 30, a command signal for instructing the wireless power-supplying device 10 to start charging the movable vehicle 30 is output from the controller 38 of the movable vehicle 30. This command signal is sent through, for instance, wireless communication.

When the command signal for instructing to start charging is input, the power-supplying circuit 13 of the wireless power-supplying device 10 is controlled by the power-supplying control circuit (not illustrated), and high-frequency power is output from the power-supplying circuit 13 through the power-supplying coil 14. Thereby, the electric power is wirelessly supplied from the power-supplying coil 14 to the power-receiving coil 31 of the movable vehicle 30, and the storage battery 34 is charged by the charging circuit 33 under the control of the controller 38.

As described above, in the present embodiment, the parking assistance apparatus 20 having the plurality of exciting coils 21 and the plurality of resonators 22 connected to the respective exciting coils 21 is additionally installed around the power-supplying coil 14 provided for the wireless power-supplying device 10, and the circuit made up of the exciting coils 21 and the resonators 22 resonates with the leakage magnetic field from the power-supplying coil 14, thereby generating the magnetic field from each of the exciting coils 21. Thus, according to the magnitude of the magnetic fields generated from the exciting coils 21, the position of the movable vehicle 30 is determined and displayed on the display device 39. For this reason, the driver of the movable vehicle 30 can adjust the parking position with reference to the position of the movable vehicle 30.

Figure 5A:
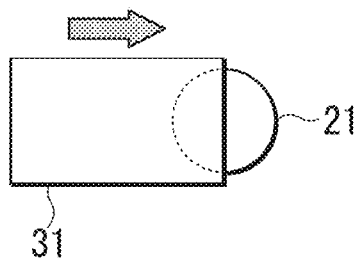
FIG. 5A is a view describing a first modification of the parking assistance system according to the embodiment of the present disclosure.
Figure 5B:
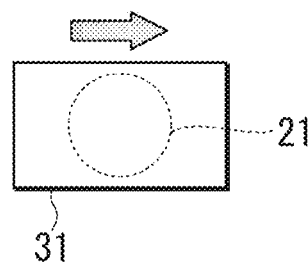
FIG. 5B is a view describing the first modification of the parking assistance system according to the embodiment of the present disclosure.
Figure 5C:
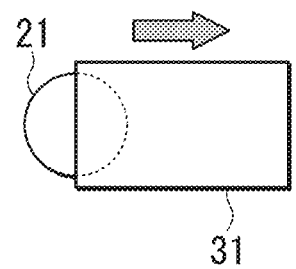
FIG. 5C is a view describing the first modification of the parking assistance system according to the embodiment of the present disclosure.

FIGS. 5A, 5B and 5C are views for describing a first modification of the parking assistance system according to the embodiment of the present disclosure. In the above-described embodiment, the description has been made on the assumption that the moving speed of the movable vehicle 30 is constant. However, when the movable vehicle 30 is parked, an accelerator pedal and a brake pedal are alternately pressed over and over, and it is hardly considered that the moving speed of the movable vehicle 30 is constant.

When the moving speed of the movable vehicle 30 is not constant, the magnitude of the input voltage of the charging circuit 33 which is monitored by the controller 38 varies even when the power-receiving coil 31 of the movable vehicle 30 passes over the same exciting coil 21. Here, since the controller 38 determines the position of the movable vehicle 30 using the result of monitoring the magnitude of the input voltage of the charging circuit 33, when the input voltage of the charging circuit 33 varies according to the speed of the movable vehicle 30, the position of the movable vehicle 30 is considered to be likely to be calculated incorrectly. In the present modification, the position of the movable vehicle 30 is determined in consideration of the speed of the movable vehicle 30.

When the movable vehicle 30 leaves (e.g., backs out of) the parking area, a relationship between the power-receiving coil 31 and the exciting coil 21 is, for example, as follows. First, an overlapping area between the power-receiving coil 31 and the exciting coil 21 in the top view as illustrated in FIG. 5A gradually increases, and then the overlapping area in the top view as illustrated in FIG. 5B is fixed. Subsequently, the overlapping area in the top view as illustrated in FIG. 5C gradually reduces, and finally the overlapping area in the top view becomes zero.

Figure 5D:
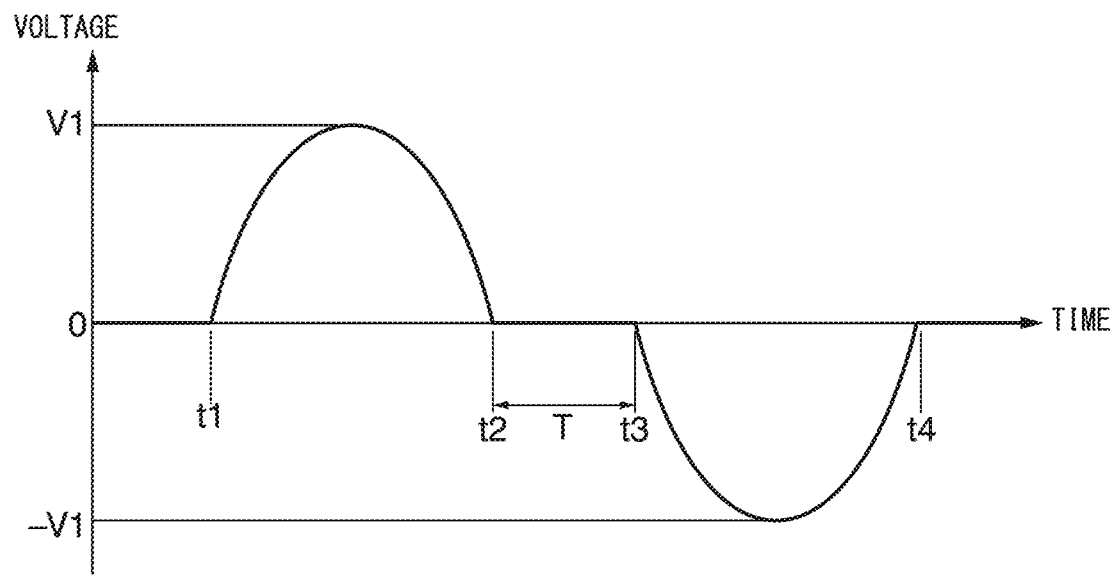
FIG. 5D is a view describing the first modification of the parking assistance system according to the embodiment of the present disclosure.

When the relationship between the power-receiving coil 31 and the exciting coil 21 is that illustrated in FIG. 5A, the input voltage of the charging circuit 33 shows, for instance, a change between times t1 and t2 in FIG. 5D. Also, when the relationship between the power-receiving coil 31 and the exciting coil 21 is that illustrated in FIG. 5B, the input voltage of the charging circuit 33 becomes zero (see period T from times t2 to t3 in FIG. 5D). In contrast, when the relationship between the power-receiving coil 31 and the exciting coil 21 is that illustrated in FIG. 5C, the input voltage of the charging circuit 33 shows, for instance, a change between times t3 and t4 in FIG. 5D.

Here, a length of the power-receiving coil 31 in a direction in which the movable vehicle 30 travels is defined as A, and a diameter of the exciting coil 21 is defined as B. A distance at which the relationship between the power-receiving coil 31 and the exciting coil 21 is that illustrated in FIG. 5B is expressed by (A−B). Accordingly, when the period T illustrated in FIG. 5D is determined, the speed of the movable vehicle 30 is obtained as (A−B)/T. Thus, if the magnitude (e.g., a voltage±V1 in FIG. 5D) of the input voltage of the charging circuit 33 is corrected according to the speed of the movable vehicle 30, the position of the movable vehicle 30 can be accurately determined.

Figure 6:
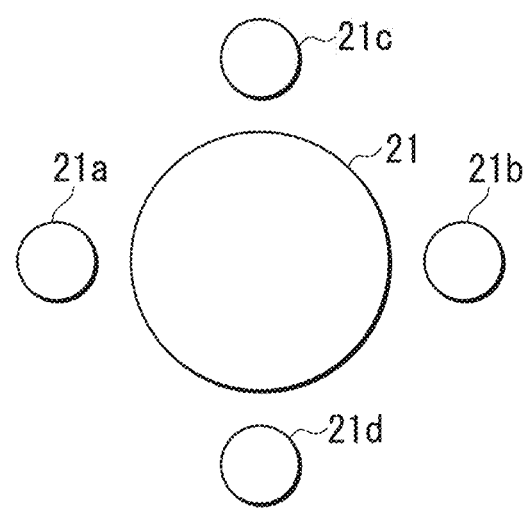
FIG. 6 is a view describing a second modification of the parking assistance system according to the embodiment of the present disclosure.

FIG. 6 is a view describing a second modification of the parking assistance system according to the embodiment of the present disclosure. In the above-described embodiment, the position of the movable vehicle 30 is determined. In the above-described first modification, the moving speed of the movable vehicle 30 is determined in addition to the position of the movable vehicle 30. In contrast, the present modification makes it possible to determine the direction in which the movable vehicle 30 travels.

As illustrated in FIG. 6, in the present modification, auxiliary exciting coils 21a to 21d are provided around the exciting coils 21 provided for the parking assistance apparatus 20. Like the exciting coils 21, to generate magnetic fields whose magnitudes are different from one another, the auxiliary exciting coils 21a to 21d are set so that the numbers of turns thereof are different from one another. Also, the similar resonator (not illustrated) as the resonator 22 connected to the exciting coil 21 is connected to each of the auxiliary exciting coils 21a to 21d. For this reason, the auxiliary exciting coils 21a to 21d are configured to resonate with the magnetic fields generated by the exciting coils 21. The number of auxiliary exciting coils provided for one of the exciting coils 21 is arbitrary.

By providing the auxiliary exciting coils 21a to 21d, the controller 38 of the movable vehicle 30 can determine a general direction in which the movable vehicle 30 enters with respect to the exciting coil 21. The entering direction of the movable vehicle 30 which the controller 38 determines may be displayed on the display device 39 by, for instance, an arrow sign. Thereby, a driver who refers to displayed content of the display device 39 can determine, for instance, whether or not a quick turn is required.

Figure 7:
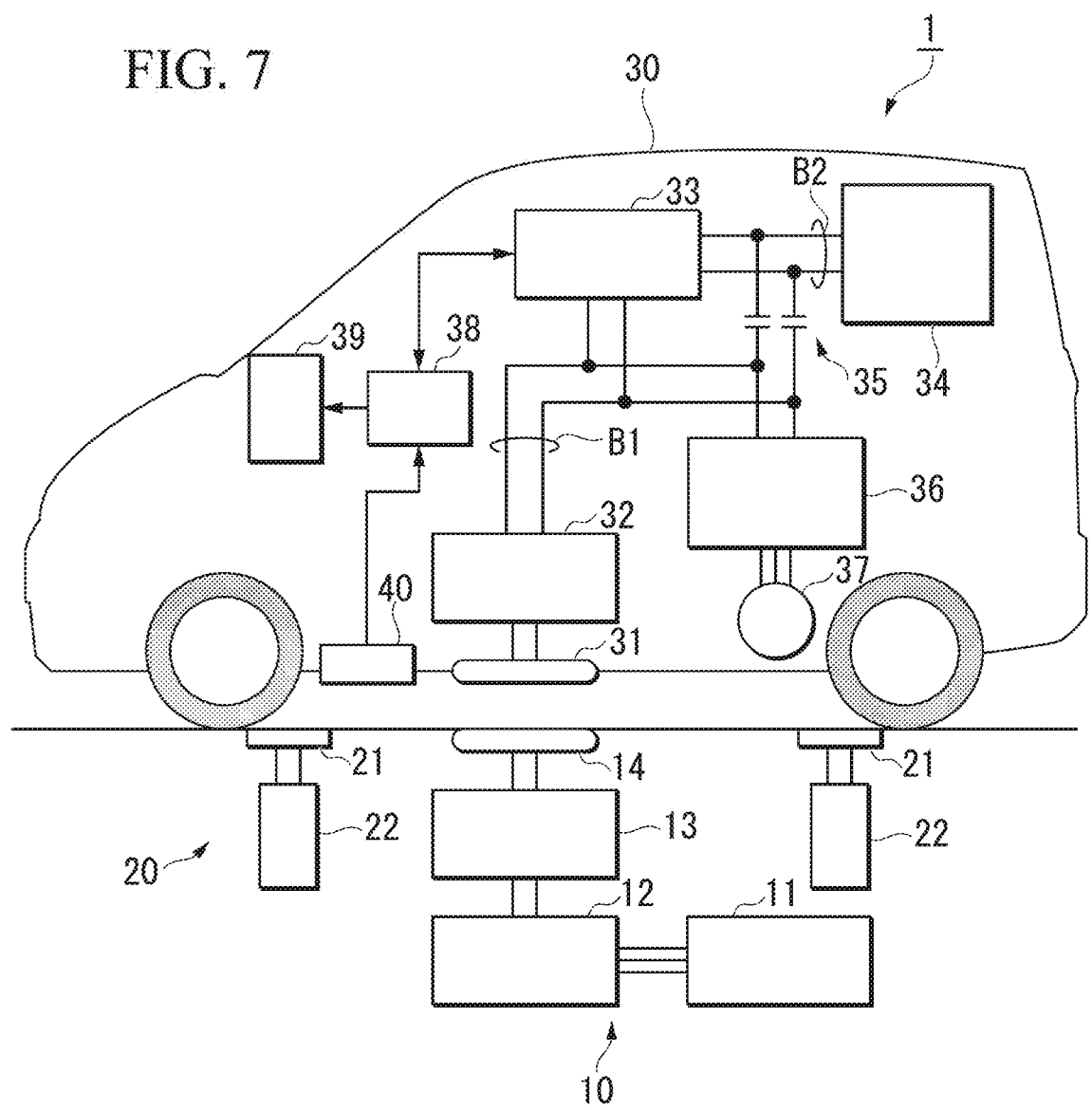
FIG. 7 is a view describing a third modification of the parking assistance system according to the embodiment of the present disclosure.

FIG. 7 is a view describing a third modification of the parking assistance system according to the embodiment of the present disclosure. In the above-described embodiment and first and second modifications, the magnetic fields generated by the exciting coils 21 (and furthermore, the auxiliary exciting coils 21a to 21d) are detected by the power-receiving coil 31 of the movable vehicle 30. In contrast, in the present modification, a dedicated sensor (detector) 40 for detecting the magnetic fields generated by the exciting coils 21 (and furthermore, the auxiliary exciting coils 21a to 21d) is provided. By providing the dedicated sensor 40, the magnetic fields generated by the exciting coils 21 can be detected with high sensitivity.

While the parking assistance apparatus and system according to the embodiment of the present disclosure have been described, the present disclosure is not limited to the embodiment, and variations and modifications can be freely made within the spirit and scope of the present disclosure. For example, in the embodiment, the example in which the exciting coils 21 are disposed around the power-supplying coil 14 has been described. However, if power-supplying efficiency from the power-supplying coil 14 to the power-receiving coil 31 is not remarkably reduced, the exciting coils 21 may be installed in a state in which some overlap the power-supplying coil 14 in the top view.

Also, in the embodiment, the example in which the exciting coils 21 are arranged around the power-supplying coil 14 at a constant interval has been described, but the exciting coils 21 may be arranged at non-constant interval. Also, in the embodiment, the example in which, to generate the magnetic fields whose magnitudes are different from one another, the exciting coils 21 are set so that the numbers of turns thereof are different from one another has been described. However, the magnetic fields whose magnitudes are different from one another may be designed to be generated from the exciting coils 21 by adjusting circuit constants of the resonators 22.

Also, in the embodiment, it has been described that the exciting coils 21 resonate with the magnetic field or the magnetic fields generated by the power-supplying coil 14 or the other exciting coils 21, but the present disclosure is not limited to this aspect. In the present disclosure, as long as the exciting coils 21 themselves generate the magnetic fields due to the magnetic field or the magnetic fields generated by the power-supplying coil 14 or the other exciting coils 21, the resonance circuits formed by the exciting coils 21 and the resonators 22 need not resonate. Although the difference between the magnetic fields generated by the other exciting coils 21 occurs according to the presence or absence of the resonance, as long as the exciting coils 21 generate a magnetic field, an induced voltage is generated at the power-receiving coil 31 provided in the movable vehicle 30 and is reflected in the magnitude of the input voltage of the charging circuit 33, and the movable vehicle 30 can detect its own position.

In the embodiment, the magnetic field resonance system is employed as the method for wirelessly supplying the electric power, but an electromagnetic induction system may be employed.

INDUSTRIAL APPLICABILITY

According to the present disclosure, it is possible to provide a parking assistance apparatus and system enabling adjustment of a parking position with reference to a position of a movable vehicle.

The invention claimed is:

1. A parking assistance apparatus that assists with parking of a movable vehicle in a parking area in which a power-supplying coil wirelessly supplying electric power to a power-receiving coil provided in the movable vehicle is installed, the parking assistance apparatus comprising:
a plurality of exciting coils installed in the parking area, the plurality of exciting coils having no connection with a power supply; and
a plurality of resonators connected to the respective exciting coils and set to resonate due to leakage magnetic flux of the power-supplying coil,
wherein the plurality of exciting coils generate, due to the leakage magnetic flux, magnetic fields whose magnitudes are different from one another.

2. The parking assistance apparatus according to claim 1, wherein the exciting coils are set to mutually have different numbers of turns.

3. The parking assistance apparatus according to claim 2, wherein the numbers of turns of the exciting coils are set so that generated magnetic flux gradually increases or decreases toward the power-supplying coil.

4. The parking assistance apparatus according to claim 3, wherein the exciting coils are radially arranged around the power-supplying coil at a constant interval or are arranged in a circumferential direction of a concentric circle centered at the power-supplying coil at a constant interval.

5. The parking assistance apparatus according to claim 2, wherein the exciting coils are radially arranged around the power-supplying coil at a constant interval or are arranged in a circumferential direction of a concentric circle centered at the power-supplying coil at a constant interval.

6. The parking assistance apparatus according to claim 1, wherein the exciting coils are radially arranged around the power-supplying coil at a constant interval or are arranged in a circumferential direction of a concentric circle centered at the power-supplying coil at a constant interval.

7. A parking assistance system that assists with parking in a parking area in which a power-supplying coil wirelessly supplying electric power is installed, the parking assistance system comprising:
the parking assistance apparatus according to claim 1; and
the movable vehicle having a detector that detects magnetic flux generated by the exciting coils provided for the parking assistance apparatus, a position calculator that determines a position of the movable vehicle based on a detected result of the detector, and a display unit that displays the position determined by the position calculator.

8. The parking assistance system according to claim 7, wherein the movable vehicle includes the power-receiving coil that receives the electric power wirelessly supplied from the power-supplying coil.

9. The parking assistance system according to claim 8, wherein the power-receiving coil serves as the detector.

10. The parking assistance system according to claim 9, wherein the display unit displays a positional relationship between the power-supplying coil and the movable vehicle based on a calculated result of the position calculator.

11. The parking assistance system according to claim 7, wherein the display unit displays a positional relationship between the power-supplying coil and the movable vehicle based on a calculated result of the position calculator.

12. The parking assistance system according to claim 8, wherein the display unit displays a positional relationship between the power-supplying coil and the movable vehicle based on a calculated result of the position calculator.

13. The parking assistance apparatus according to claim 1, wherein the power-supplying coil and the plurality of exciting coils do not overlap when seen in a top view.

14. The parking assistance apparatus according to claim 1, wherein each of the plurality of exciting coils is provided with a coil surface, and the coil surface of one of the plurality of exciting coils disposed closest to the power-supplying coil is substantially orthogonal to the leakage magnetic flux.

15. The parking assistance apparatus according to claim 1, wherein each of the plurality of exciting coils and each of the plurality of resonators is respectively connected by a lead, and
at least part of the lead is substantially orthogonal to the leakage magnetic flux.

16. A parking assistance apparatus that assists with parking of a movable vehicle in a parking area in which a power-supplying coil wirelessly supplying electric power to a power-receiving coil provided in the movable vehicle is installed, the parking assistance apparatus comprising:
a plurality of exciting coils installed in the parking area, the plurality of exciting coils having no connection with a power supply; and
a plurality of resonators connected to the respective exciting coils,
wherein the plurality of exciting coils generate, due to leakage magnetic flux of the power-supplying coil, magnetic fields whose magnitudes are different from one another.

17. The parking assistance apparatus according to claim 16, wherein the power-supplying coil and the plurality of exciting coils do not overlap when seen in a top view.

18. The parking assistance apparatus according to claim 16, wherein each of the plurality of exciting coils is provided with a coil surface, and the coil surface of one of the plurality of exciting coils disposed closest to the power-supplying coil is substantially orthogonal to the leakage magnetic flux.

19. The parking assistance apparatus according to claim 16, wherein each of the plurality of exciting coils and each of the plurality of resonators is respectively connected by a lead, and
at least part of the lead is substantially orthogonal to the leakage magnetic flux.

20. The parking assistance apparatus according to claim 16,
wherein the parking assistance apparatus assists with parking of a movable vehicle in a parking area for one vehicle, and
the plurality of exciting coils are installed per the parking area for one vehicle.

* * * * *